United States Patent
Albat

(10) Patent No.: US 7,347,048 B2
(45) Date of Patent: Mar. 25, 2008

(54) INTERNAL COMBUSTION ENGINE COMPRISING AN ENGINE BRAKING ARRANGEMENT

(75) Inventor: Rainer Albat, Fellbach (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 11/363,502

(22) Filed: Feb. 27, 2006

(65) Prior Publication Data

US 2006/0174620 A1 Aug. 10, 2006

Related U.S. Application Data

(63) Continuation-in-part of application No. PCT/EP2004/008978, filed on Aug. 11, 2004.

(30) Foreign Application Priority Data

Aug. 29, 2003 (DE) .................... 103 39 857

(51) Int. Cl.
- F02G 3/00 (2006.01)
- F02B 37/00 (2006.01)
- F02B 41/10 (2006.01)
- F02D 29/00 (2006.01)
- F02D 9/06 (2006.01)
- F16K 11/085 (2006.01)

(52) U.S. Cl. .................... 60/624; 60/614; 137/625.47

(58) Field of Classification Search ............... 60/624, 60/614; 137/625.47; F02B 37/00, 41/10; F02D 29/00, F02D 9/06

See application file for complete search history.

(56) References Cited

U.S. PATENT DOCUMENTS

| | | | |
|---|---|---|---|
| 4,748,812 A | 6/1988 | Okada et al. .................. | 60/624 |
| 4,973,406 A * | 11/1990 | Ponzielli ................. | 137/625.32 |
| 5,529,026 A * | 6/1996 | Kurr et al. .................. | 123/41.1 |
| 5,690,070 A * | 11/1997 | Wendel et al. ......... | 123/339.25 |
| 5,893,392 A * | 4/1999 | Spies et al. ............ | 137/625.47 |
| 7,010,918 B2 * | 3/2006 | Ruess .......................... | 60/624 |

FOREIGN PATENT DOCUMENTS

| | | |
|---|---|---|
| DE | 197 24 584 | 10/1998 |
| DE | 10222919 A1 * | 12/2003 |
| EP | 63 057824 | 3/1988 |
| EP | 0 292 010 | 11/1988 |
| EP | 0 301 547 | 2/1989 |
| EP | 0 477 579 | 2/1997 |
| JP | 03061612 A * | 3/1991 |

* cited by examiner

*Primary Examiner*—Thai-Ba Trieu
(74) *Attorney, Agent, or Firm*—Klaus J. Bach

(57) ABSTRACT

In an internal combustion engine comprising an engine braking arrangement including a constant throttle valve, an exhaust gas turbocharger with a variable turbine guide vane structure and a power turbine connected to an exhaust tract and a compressor connected to an intake tract of the internal combustion engine, the power turbine is disposed in the exhaust duct downstream of the exhaust gas turbine and is driven by the exhaust gas of the internal combustion engine and a bypass device is provided in a bypass pipe which extends around the power turbine and via which the exhaust pipe can be completely closed and the bypass pipe can be completely or partially closed so as to selectively partially or completely block the exhaust gas flow and the bypass flow to an exhaust gas discharge pipe.

8 Claims, 2 Drawing Sheets

INTERNAL COMBUSTION ENGINE COMPRISING AN ENGINE BRAKING ARRANGEMENT

This is a Continuation-In-Part Application of International Application PCT/EP2004/008978 filed 11 Aug. 2004 and claiming the priority of German application 103 39 857.0 filed 29 Aug. 2003.

BACKGROUND OF THE INVENTION

The invention relates to an internal combustion engine comprising an engine braking arrangement in the form of a compression brake.

Patent Specification EP 0 477 579 B1 discloses such an internal combustion engine comprising an engine braking arrangement in the form of a compression brake. The internal combustion engine has an exhaust gas turbocharger, the exhaust gas turbine of which is disposed in an exhaust tract, and the compressor of which is disposed in an intake tract of the internal combustion engine. A power turbine which is driven by the exhaust gas of the internal combustion engine and is coupled to the internal combustion engine via a transmission is provided downstream of the exhaust gas turbine. A bypass device including a bypass pipe which extends around the power turbine and can be opened or closed is provided in the exhaust pipe downstream of the power turbine. The bypass device is designed as a variable switching valve in the form of a butterfly valve. The exhaust gas of the internal combustion engine drives the exhaust gas turbine which drives the compressor via a common shaft. The compressor compresses combustion air and conveys the compressed air into the intake tract of the internal combustion engine. The exhaust gas of the internal combustion engine first flows into the exhaust gas turbine of the exhaust gas turbocharger and then on into the power turbine which supplies the rest of the energy extracted from the exhaust gas to the internal combustion engine via the transmission. In the engine braking mode, the fuel injection is deactivated and the compression brake is activated. At the end of a compression stroke, the compression brake opens for a short period at least one outlet valve provided in the cylinder head. When the outlet valve is open, the compressed air in the combustion space then escapes into the exhaust tract.

During motor braking the internal combustion engine only carries out compression work and thereby generates braking power. The compression work is dependent on the degree of filling of the cylinders. In order to achieve a high degree of filling, the exhaust gas back pressure downstream of the exhaust gas turbine has to be low. However, the power turbine downstream of the exhaust gas turbine constitutes a throttle which increases the exhaust gas back pressure. In addition, the power turbine which is driven by the exhaust gas drives the internal combustion engine. In order to lower the exhaust gas back pressure and avoid the driving of the power turbine, the bypass device opens. The exhaust gas then flows into the bypass pipe past the power turbine. The braking power generated by a pulsed compression brake shows a flat, approximately linear profile over the rotational speed. This means that, at low to medium rotational speeds of the engine, the braking power is relatively low.

It is the object of the present invention to provide an internal combustion engine providing a braking power which is significantly increased at low and medium rotational speeds of the internal combustion engine, that is, an engine whose braking power profile is advantageously high even at medium to high rotational speeds of the internal combustion engine.

SUMMARY OF THE INVENTION

In an internal combustion engine comprising an engine braking arrangement including a constant throttle valve, an exhaust gas turbocharger with a variable turbine guide vane structure and a power turbine connected to an exhaust tract and a compressor connected to an intake tract of the internal combustion engine, the power turbine is disposed in the exhaust duct downstream of the exhaust gas turbine and is driven by the exhaust gas of the internal combustion engine and a bypass device is provided in a bypass pipe which extends around the power turbine and via which the exhaust pipe can be completely closed and the bypass pipe can be completely or partially closed so as to selectively partially or completely block the exhaust gas flow and the bypass flow to an exhaust gas discharge pipe.

The internal combustion engine according to the invention is characterized by the bypass device which is designed in the form of a combined switching and throttle valve, so that the exhaust pipe can be completely closed and the bypass pipe can be completely or partially closed. At the internal combustion engine comprising an engine braking mechanism in the form of a compression brake, an exhaust gas turbocharger and a power turbine are provided. The exhaust gas turbocharger has an exhaust gas turbine disposed in an exhaust tract and a compressor in an intake tract. The power turbine is arranged downstream of the exhaust gas turbine and is connected to the internal combustion engine via a transmission. The exhaust gas turbine and the power turbine are connected to each other via a connecting pipe. A bypass pipe branches off from the connecting pipe and extends around the power turbine. A bypass control device controls the quantity of exhaust gas bypassed around the power turbine. In addition to controlling the quantity of exhaust gas in the bypass pipe, the bypass device opens or closes the engine exhaust pipe extending from the power turbine to the bypass device. The advantage of this arrangement is that a switching valve and a throttle valve are combined in a common component, the bypass device.

In a refinement of the invention, the bypass device is designed in such a manner that, for a complete closing of the exhaust pipe and of the bypass pipe by the bypass device, said pipes can be closed in a gastight manner. In order to achieve the highest possible efficiency in the combustion mode or in the engine braking mode of the internal combustion engine, it is necessary to precisely control the exhaust gas flow. For example, if a bypass pipe is not closed in a gastight manner in the combustion mode, exhaust gas energy is lost, since this energy is no longer available to the power turbine driven by exhaust gas via the opened exhaust pipe.

Preferably, the bypass device is a rotary slide valve. The advantage of the use of a rotary slide as bypass device resides in low operating forces required even at high exhaust gas pressures.

In a further refinement of the invention, the rotary slide valve has a housing with a tubular duct which is placed therein and in which a freely rotatable rotor is mounted which has a circular sector-shaped cross section. The housing has an opening to the exhaust pipe, an opening to the bypass pipe and an opening to an exhaust pipe through which the exhaust gas can be discharged to the atmosphere or into an exhaust system. The duct permits the exhaust pipe and the bypass pipe to be placed into communication with the exhaust pipe. The circular sector-shaped cross-section of the valve rotor is selected in such a manner that the rotor can either completely close the exhaust pipe and the bypass duct or just the exhaust pipe or can close the exhaust pipe completely and the bypass pipe partially. The advantage resides in the simple, pressure insensitive and gastight construction even at high exhaust gas pressures.

In a further refinement of the invention, the circular sector-shaped cross section of the valve rotor has a circular sector angle of 120° to 140°. The selection of this circular sector angle makes it possible to realize a flat, construction-space-saving construction of the housing and of the connected pipes.

In a particular embodiment of the invention, the compression brake opens in the engine braking mode and the bypass device closes the exhaust pipe and the bypass pipe at low to medium rotational speeds of the internal combustion engine in the engine braking mode. The compression brake is preferably designed in the form of a known constant throttle. The constant throttle is an additional throttle valve in the cylinder head that can be opened continuously in the engine braking mode. The throttle valve opens or closes a bypass around an outlet valve of a cylinder of the internal combustion engine, so that compressed air passes into the exhaust tract. In the engine braking mode, the constant throttle opens and releases at least some of the compressed gas. In addition, the bypass device closes the exhaust pipe and the bypass pipe in the engine braking mode. As a result, the pumping power of the internal combustion engine is additionally increased. The advantage of the use of a constant throttle with the bypass device as an airbrake resides in the increased braking power at low to medium rotational speeds of the internal combustion engine. In addition, a brake flap can be omitted in the exhaust system.

In a further refinement of the invention, the compression brake valve opens in the engine braking mode and the exhaust gas turbine which has a variable turbine geometry which, in the engine braking mode, changes the flow of exhaust gas to a turbine wheel in such a manner that, at medium to high rotational speeds of the internal combustion engine, the rotational speed of the exhaust gas turbine is increased, as the bypass device closes the exhaust pipe and completely opens the bypass pipe. The variable turbine geometry is in the form of a known guide vane structure, in particular a radial guide vane structure with adjustable or fixed guide vanes. In the engine braking mode, the radial guide vane structure reduces the effective turbine inlet flow cross section, so that the velocity of the exhaust gas increases. As a result, the rotational speed of the exhaust gas turbine increases. The increased rotational speed of the exhaust gas turbine also results in an increase of the rotational speed of the compressor, thus increasing the charging pressure. With an increase in the charging pressure, the filling in the cylinder increases and, in conjunction with a constant throttle, the braking power also increases. At the same time, in the engine braking mode, the bypass device closes the exhaust pipe and opens the bypass pipe. The exhaust gas flows through the bypass pipe past the power turbine. As a result, the exhaust gas back pressure downstream of the exhaust gas turbine drops. The increased difference in pressure causes the rotational speed of the exhaust gas turbine to increase. This advantageously leads to an additional increase in the charging pressure and therefore to an increased braking power. In addition, the power turbine contributes to the braking power, since the internal combustion engine now drives the power turbine and the power turbine does not supply energy from the exhaust gas to the internal combustion engine.

In a further refinement of the invention, the compression brake valve opens in the engine braking mode and the exhaust gas turbine which has a variable turbine geometry which, in the engine braking mode, changes the flow of exhaust gas to a turbine wheel in such a manner that, in the engine braking mode, the rotational speed of the exhaust gas turbine is increased at high to very high rotational speeds of the internal combustion engine, as the bypass device closes the exhaust pipe and partially closes the bypass pipe. In the case of an internal combustion engine with an exhaust gas turbocharger, the exhaust gas turbocharger is configured optimally for the combustion mode of the internal combustion engine. Therefore, in the engine braking mode, critical rotational speeds of the exhaust gas turbocharger may be exceeded, in particular if an exhaust gas turbine of an exhaust gas turbocharger has a variable turbine geometry. In the engine braking mode, the variable turbine geometry serves to increase the rotational speed of the exhaust gas turbocharger. Throttling of the bypass pipe causes the exhaust gas back pressure to increase downstream of the exhaust gas turbine, which leads to a reduction in the difference in pressure at the exhaust gas turbine and causes a reduction in the rotational speed of the exhaust gas turbocharger. The advantage resides in the omission of a rotational-speed-regulating measure at the exhaust gas turbocharger, for example a waste-gate valve.

In a further refinement of the invention, in the engine braking mode, the outlet valves of the internal combustion engine can be briefly opened by pressure peaks of the exhaust gas in the exhaust tract, as a result of which exhaust gas passes from the exhaust tract into the cylinders of the internal combustion engine. The short opening of the outlet valves is possible in particular at low cylinder pressures. In particular at the end of the first working stroke (intake) or at the beginning of the second working stroke (compression), this leads to a recharging effect, in which exhaust gas passes out of the exhaust tract into the cylinders of the internal combustion engine. The recharging effect advantageously leads to an increased filling of cylinders and therefore to an increased engine braking power.

Further features and combinations of features will become apparent from the following description on the basis of the accompanying drawings wherein a specific exemplary embodiment of the invention is illustrated in simplified form:

DESCRIPTION OF AN EXEMPLARY EMBODIMENT

Figure 1:
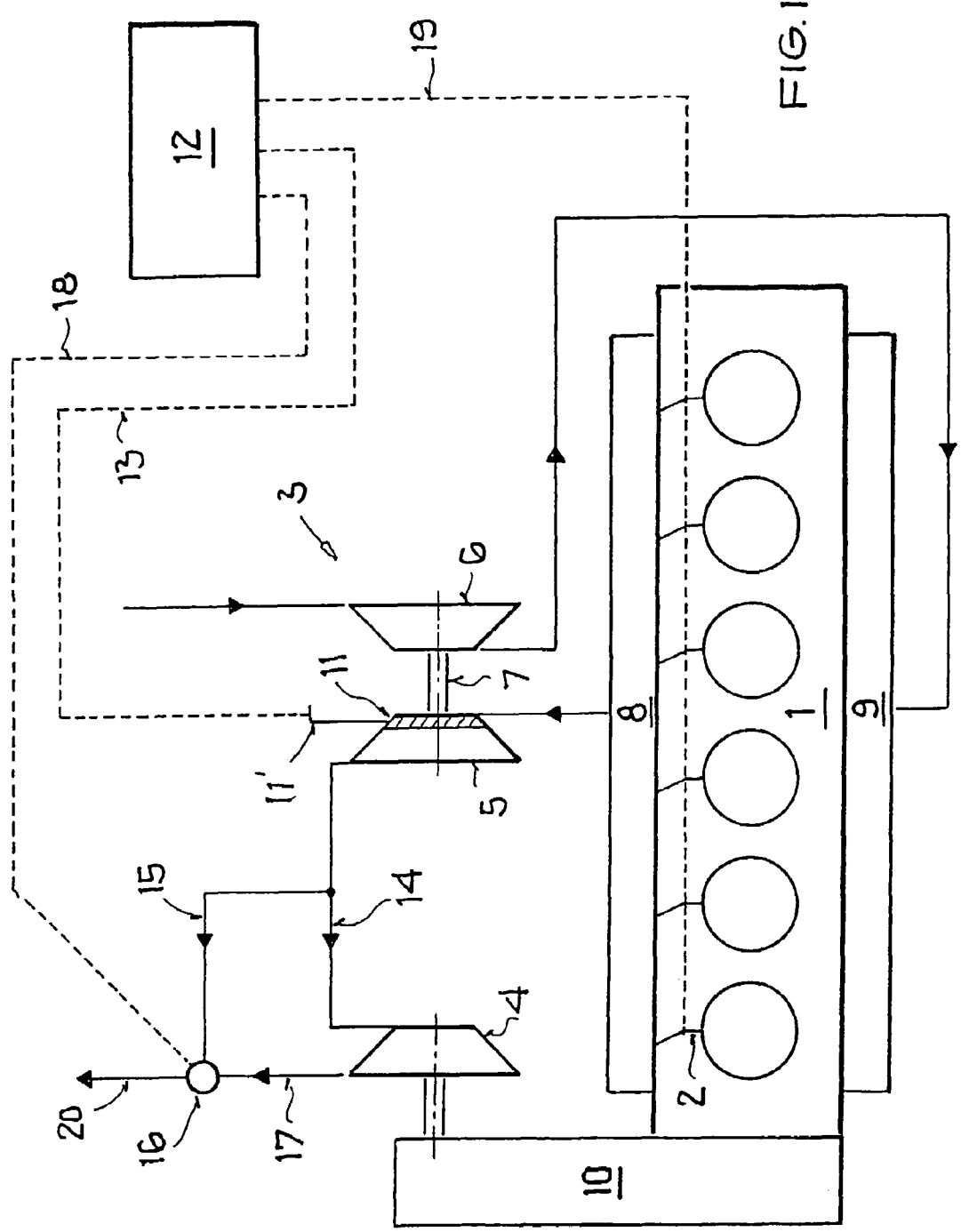
FIG. 1 shows a diagrammatically simplified illustration of an internal combustion engine which is equipped with an engine braking mechanism, an exhaust gas turbocharger and a power turbine.

FIG. 1 illustrates, in diagrammatically simplified form, an internal combustion engine 1 with at least one outlet valve per cylinder, the internal combustion engine being equipped with an engine braking mechanism including a constant throttle 2, with an exhaust gas turbocharger 3 and a power turbine 4. The engine braking mechanism 2 is in the form of a known compression brake, preferably as a constant throttle. For the construction and the manner of operation of the constant throttle, reference is made by way of example to DE 197 27 584 C1. The exhaust gas turbocharger 3 has an exhaust gas turbine 5 and a compressor 6 which are connected to each other via a common shaft 7. The exhaust gas turbine 5 is connected to an exhaust tract 8 and the compressor 6 is connected to an intake tract 9 of the internal combustion engine 1. A charge air cooler (not illustrated specifically) can be placed in the intake tract 9. The power turbine 4 is provided downstream of the exhaust gas turbine 5 and is coupled to the internal combustion engine 1 via a transmission 10. The exhaust gas turbine 5 is equipped with a variable turbine geometry 11. The variable turbine geometry 11 is designed as a radial guide vane structure with adjustable or fixed guide vanes. With the aid of the radial guide vane structure 11, the exhaust gas flow upstream of a turbine wheel to the vanes of the turbine wheel of the exhaust gas turbine 5 can be changed. By means of an actuating device 11' (not illustrated specifically) which acts on the radial guide vane structure 11 and is situated outside a housing of the exhaust gas turbine 5, the radial guide vanes can be actuated electrically, pneumatically or hydraulically. The actuating device 11' is controlled by means of an electronic engine control unit 12 which is connected to the actuating device via a first control line 13. The exhaust gas turbine 5 and the power turbine 4 are connected to each other via a connecting pipe 14. A bypass pipe 15 branches off from the connecting pipe 14. A bypass device 16 is provided in the bypass pipe 15 around the power turbine 4. The bypass device 16 controls the quantity of bypassed exhaust gas around the power turbine 4. In addition to controlling the quantity of exhaust gas in the bypass pipe 15, the bypass device 16 opens or closes an exhaust pipe 17 which leads from the power turbine 4 to the bypass device 16. The bypass device 16 is controlled by means of the engine control unit 12 via a second control line 18. In addition, the engine control unit 12 controls the constant throttle 2 via a third control line 19. The exhaust gases flow on via the bypass device 16 into an exhaust pipe 20 and into the atmosphere or into a continuing exhaust system (not illustrated specifically).

FIGS. 2 to 5 show a diagrammatically simplified embodiment of the bypass device 16 according to the invention. The bypass device 16 is designed in the form of a rotary slide valve or cylindrical valve with a housing 21. The housing 21 has a tubular opening 22 in which a freely rotatable rotor 23 is mounted. The housing 21 has a side wall opening 24 to the bypass line 15, an opening 25 to the exhaust pipe 17 and an opening 26 to the exhaust pipe 20. The rotor 23 in the housing 21 permits either the bypass pipe 15 or the exhaust pipe 17 to communicate with the exhaust pipe 20 via the opening 22. The design of the rotor 23 is implemented in such a manner that, in a position according to FIG. 3, both the bypass 15 and the exhaust pipe 17 are closed by covering the openings 24 and 25 by means of the rotor 23. In a position according to FIG. 2, the bypass pipe 15 is closed and the exhaust pipe 17 is completely opened. In a position according to FIG. 4, the bypass pipe 15 is completely opened and the exhaust pipe 17 is closed. In a position according to FIG. 5, the bypass pipe 15 is partially opened and the exhaust pipe 17 is closed. The rotor 23 is preferably designed as a rod element with a circular sector-shaped cross section which has a circular sector angle of 120° to 140°. A rotor 23 is also conceivable which has two circular sector-shaped cross sections which are arranged one above the other in the longitudinal direction of an axis of rotation of the rotor. The two circular sector-shaped cross sections can have different circular sector angles and can be at any desired angle to one another corresponding to the position of the openings 23, 24 or 25 to be closed, to be opened or to be partially opened in the housing 21. The rotary slide valve 16 is designed in such a manner that, when one of the openings 24 and 25 is fully covered, the rotor 23 closes said openings in a gastight manner. By means of an actuating device (not illustrated specifically) which acts on the rotor 23 and is situated outside the rotary slide valve 16, the rotor 23 can be rotated electrically, pneumatically or hydraulically. An electric servomotor is preferably provided for this. The advantage of using a rotary slide valve 16 resides in its gastightness with the rotor 23 fully covering the openings 24 and 25 to the pipes 15 and 17, respectively, and the need for only low actuating forces even at high exhaust gas pressures.

Figure 2:
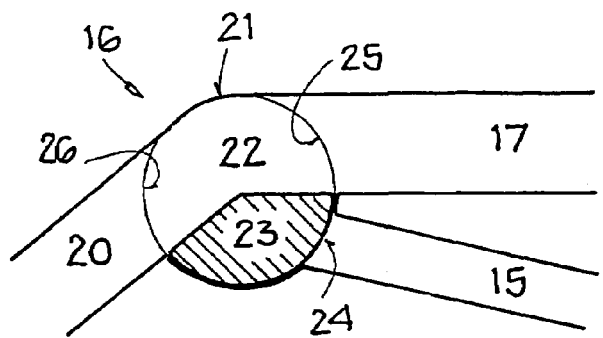
FIG. 2 shows a diagrammatically simplified illustration of the rotary slide valve according to the invention with open exhaust pipe and closed bypass pipe.

In the combustion mode, the internal combustion engine 1 takes in air, which has been pre-compressed by the compressor 6, from the intake tract 9. In the cylinders of the internal combustion engine 1, the pre-compressed air is further compressed and the compressed air is mixed with fuel (diesel engine) or a fuel-air mixture which is already present is compressed (gasoline engine). The exhaust gas arising because of the combustion of the fuel-air mixture flows through the exhaust gas turbine 5 without being affected in its flow by the radial guide grid 11. The exhaust gas turbine 5 drives the compressor 6 by means of a common shaft 7. As illustrated in FIG. 2, the rotor 23 of the rotary slide valve 16 closes the bypass pipe 15 and opens the exhaust pipe 17, so that all the exhaust gas flows through the power turbine 4. The power turbine 4 can absorb the rest of the energy of the exhaust gas and can subsequently supply it to the internal combustion engine 1 by means of the transmission 10.

In the engine braking mode, the internal combustion engine 1 takes in precompressed air from the intake tract 8. The internal combustion engine 1 compresses the air but no fuel is added to the compressed air, so that no combustion can take place. Instead, the engine control unit 12 uses the control line 19 to open the constant throttle 2 in the respective cylinders in order to allow the compressed air to escape from the internal combustion engine 1 into the exhaust tract 8. The constant throttle 2 is an additional throttle valve in the cylinder head that is open continuously in the engine braking mode. The throttle valve opens or closes a bypass around an outlet valve of a cylinder of the internal combustion engine 1, so that compressed air passes into the exhaust tract 8.

The braking power of the internal combustion engine 1 is provided as a result of the power which the internal combustion engine 1 consumes in order to compress the air taken in but not retained because of decompression of the compressed air. In order to further increase the braking power in the engine braking mode, the engine control unit 12 additionally activates the rotary slide valve 16 and operates the radial guide vane structure 11 as a function of the rotational speed of the internal combustion engine 1.

Figure 3:
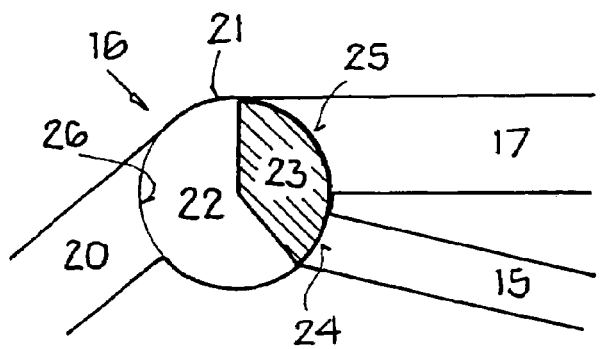
FIG. 3 shows a diagrammatically simplified illustration of the rotary slide valve according to the invention with closed exhaust pipe and closed bypass pipe.
Figure 4:
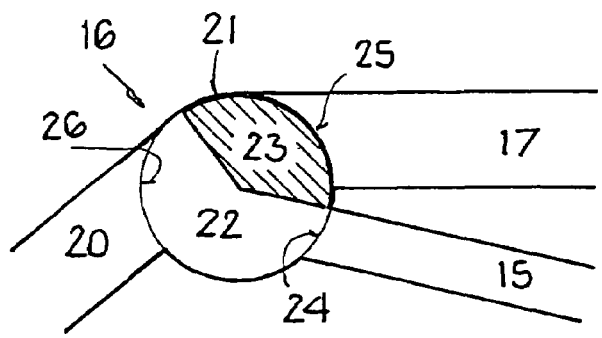
FIG. 4 shows a diagrammatically simplified illustration of the rotary slide valve according to the invention with closed exhaust pipe and with opened bypass pipe.
Figure 5:
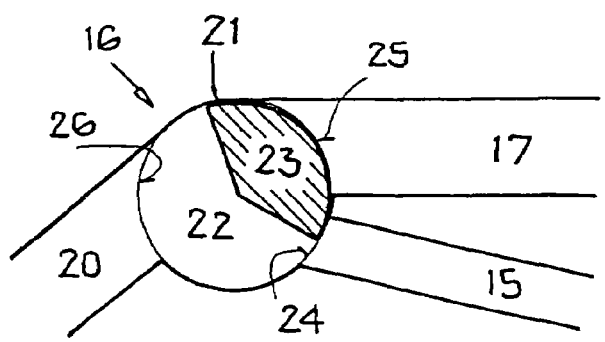
FIG. 5 shows a diagrammatically simplified illustration of the rotary slide valve according to the invention with closed exhaust pipe and with partially opened bypass pipe.

At low to medium rotational speeds of the internal combustion engine 1, the constant throttle 2 interacts with the rotary slide valve 16 in such a manner that the constant throttle 2 is opened and the rotor 23 closes the bypass pipe 15 and the exhaust pipe 17 both in an equally gastight manner (FIG. 3). As a result, the pumping power or engine braking power of the internal combustion engine 1 is increased, since, owing to the higher exhaust gas back pressure in the exhaust tract 8, the pistons in the fourth working stroke (exhaust stroke) have to carry out a higher amount of exhaust work.

At medium to high rotational speeds of the internal combustion engine 1, the constant throttle 2 interacts with the radial guide vane structure 11 and the rotary slide valve 16 in such a manner that the constant throttle 2 is opened and the radial guide vane structure 11 changes the effective turbine flow cross-section in such a manner that the rotational speed of the exhaust gas turbine 5 increases. As a result, the charging pressure and therefore the filling of the cylinders increase and finally so does the compression work in the engine braking mode. In this case, the rotor 23 closes the exhaust pipe 17 and completely (FIG. 4) or only partially (FIG. 5) opens the bypass pipe 15, with the bypass pipe 15 and the exhaust pipe 20 being connected to each other via the duct 22 of the rotary slide valve 16. The exhaust gas flows through the bypass pipe 15 past the power turbine 4. As a result, the exhaust gas back pressure downstream of the exhaust gas turbine 5 drops and, because of the increased difference in pressure at the exhaust gas turbine 5, the rotational speed of the exhaust gas turbine 5 increases. This advantageously leads to an additional increase in the charging pressure and therefore to an increase in the engine braking power. In order to avoid critical rotational speeds of the exhaust gas turbocharger 3 being exceeded at high to very high rotational speeds of the internal combustion engine 1, partial closing of the bypass pipe 15 by means of the rotary slide valve 16 causes the exhaust gas back pressure downstream of the exhaust gas turbine 5 to be increased, which leads to a reduction in the difference in pressure at the exhaust gas turbine 5 and to a drop in the rotational speed of the exhaust gas turbocharger 3.

In the engine braking mode, exhaust gas pressure peaks occurring in the exhaust tract 8 may lead to a short opening of the outlet valves, in particular at low cylinder pressures. This leads in particular at the end of the first working stroke (intake) or at the beginning of the second working stroke (compression) to a recharging effect, in which exhaust gas from the exhaust tract 8 passes into the cylinders of the internal combustion engine 1 as the pressure peaks open the exhaust valves. The recharging effect leads to an increased filling of the cylinder and therefore to an increased engine braking power. With weaker valve springs at the outlet valves, the outlet valves would open at relatively low pressure peaks and the braking power could be further increased. However, it has to be ensured that the outlet valves exactly follow the cam shape during the charge cycle and the outlet valves do not lift off even at very high rotational speeds of the internal combustion engine.

In the engine braking mode, the power turbine 4 contributes to the braking power, since it is then driven along by the internal combustion engine 1.

A characteristic for controlling the constant throttle 2, the radial guide grid 11 and the rotary slide valve 16 is deposited in the engine control unit 12. The characteristic has been determined beforehand in bench tests as a function of the exhaust gas temperature of the internal combustion engine 1 and the rotational speed of the exhaust gas turbocharger 3. In this case, the transition point is defined at a medium rotational speed at which the constant throttle 2 interacts with the rotary slide valve 16 or the radial guide vane structure 11 and the rotary slide valve 16. At a medium rotational speed, the transition point depends on a maximum permissible exhaust gas temperature and/or indicated work in the engine braking mode from the high- and low-pressure loop. In the case of engines for utility vehicles having approximately two liters displacement per cylinder, the transition point is situated between a rotational speed of the internal combustion engine 1 of n=1400/min and n=1600/min, preferably at a rotational speed of n=1500/min.

Instead of the rotary slide valve 16, it is conceivable to place a switching valve into the exhaust pipe 17 and a throttle valve into the bypass pipe 15. The switching valve and the throttle valve are connected via control lines to the engine control unit 12 which can activate corresponding operating devices at the switching valve and the throttle valve.

What is claimed is:

1. An internal combustion engine (1) comprising an engine compression brake arrangement having at least one throttle valve (2) per cylinder of the internal combustion engine (1), said engine including an exhaust gas turbocharger (3) having an exhaust gas turbine (5) disposed in an exhaust tract (8) and a compressor (6) disposed in an intake tract (9) of the internal combustion engine (1), a power turbine (4) which is driven by the exhaust gas of the internal combustion engine (1) and is coupled via a transmission (10) to the internal combustion engine (1), said power turbine (4) being disposed in the exhaust gas tract (8) downstream of the exhaust gas turbine (5), with a bypass pipe (15) extending around the power turbine (4) and a bypass device (16) disposed in the bypass pipe (15), the bypass device (16) being connected also to the power turbine (4) via an exhaust pipe (17), the bypass device (16) being designed in the form of a combined switching and throttle valve for selectively closing the exhaust pipe (17) and completely or partially closing the bypass pipe (15) so as to selectively partially or completely block the flow paths from the exhaust pipe (17) and the bypass pipe (15) to an exhaust discharge pipe (20), said throttle valve (2) being open in the engine braking mode and the exhaust gas turbine (5) having a variable turbine inlet vane structure (11) which, in the engine braking mode, changes the flow of the exhaust gas to the turbine in such a manner that the rotational speed of the exhaust gas turbine (5) is increased at medium to high rotational speeds of the internal combustion engine (1) and the bypass device (16) closes the exhaust pipe (17) and completely opens the bypass pipe (15).

2. The internal combustion engine as claimed in claim 1, wherein the bypass device (16) is a valve which, in the case of complete closing of the exhaust pipe (17) and of the bypass pipe (15), closes said pipes in a gastight manner.

3. The internal combustion engine as claimed in claim 2, wherein the bypass device (16) is a rotary slide valve (16).

4. The internal combustion engine as claimed in claim 3, wherein the rotary slide valve (16) has a housing (21) with a tubular opening (22) receiving a freely rotatable rotor (23) having a circular sector-shaped cross section.

5. The internal combustion engine as claimed in claim 4, wherein the circular sector-shaped cross section of the rotor (23) has a circular sector angle of 120° to 140°.

6. The internal combustion engine as claimed in claim 1, wherein the engine compression brake arrangement includes a throttle valve (2) which opens in the engine braking mode wherein the bypass device (16) closes the exhaust pipe (17) and the bypass pipe (15) at low to medium rotational speeds of the internal combustion engine.

7. The internal combustion engine as claimed in claims 1, wherein the compression brake throttle valve (2) is open in the engine braking mode and the exhaust gas turbine (5) has a variable turbine inlet vane structure (11) which, in the engine braking mode, changes the flow of the exhaust gas to a turbine wheel in such a manner that the rotational speed of the exhaust gas turbine (5) is increased at high rotational speeds of the internal combustion engine (1), and the bypass device (16) closes the exhaust pipe (17) and partially closes the bypass pipe (15).

8. The internal combustion engine as claimed in claim 1, wherein the engine has outlet values which, in the engine braking mode, are opened by pressure peaks of the exhaust gas in the exhaust tract (8), permitting pressurized exhaust gas to flow back from the exhaust tract (8) into the cylinders of the internal combustion engine (1) to relieve the pressure peaks.

\* \* \* \* \*